(12) United States Patent
Sherwin et al.

(10) Patent No.: US 9,680,347 B2
(45) Date of Patent: Jun. 13, 2017

(54) ELECTRIC MOTOR/GEAR MECHANISM UNIT

(71) Applicant: MAXON MOTOR AG, Sachseln (CH)

(72) Inventors: Daniel Sherwin, Jerusalem (IL); Albert Hugo Fritschy, Sachseln (CH); Franzxaver Fölmli, Oberdorf (CH); Jens Oliver Schulze, Giswil (CH); Raniero Pittini, Hergiswil (CH); Dirk Zimmermann, Sexau (DE)

(73) Assignee: MAXON MOTOR AG, Sachseln (CH)

( * ) Notice: Subject to any disclaimer, the term of this patent is extended or adjusted under 35 U.S.C. 154(b) by 104 days.

(21) Appl. No.: 14/449,388

(22) Filed: Aug. 1, 2014

(65) Prior Publication Data

US 2014/0342867 A1    Nov. 20, 2014

Related U.S. Application Data

(63) Continuation of application No. 13/120,859, filed as application No. PCT/EP2009/008518 on Nov. 30, 2009, now Pat. No. 8,829,750.

(30) Foreign Application Priority Data

Nov. 30, 2008 (IL) ................................. 195613

(51) Int. Cl.
*H02K 7/116* (2006.01)
*H02K 3/47* (2006.01)
(Continued)

(52) U.S. Cl.
CPC ............. *H02K 7/116* (2013.01); *H02K 1/223* (2013.01); *H02K 1/2706* (2013.01); *H02K 3/47* (2013.01); *H02K 9/00* (2013.01); *H02K 23/58* (2013.01)

(58) Field of Classification Search
CPC ........... H02K 23/58; H02K 3/47; H02K 7/116
See application file for complete search history.

(56) References Cited

U.S. PATENT DOCUMENTS

| 4,918,344 A | 4/1990 | Chikamori et al. |
| 5,272,938 A | 12/1993 | Hsu et al. |

(Continued)

FOREIGN PATENT DOCUMENTS

| DE | 3826142 A1 | 2/1989 |
| GB | 1007524 A | 10/1965 |

(Continued)

OTHER PUBLICATIONS

International Search Report (PCT/ISA/210) mailed on Jan. 26, 2010, by the European Patent Office as the International Searching Authority for International Application No. PCT/EP2009/008518.

(Continued)

*Primary Examiner* — Dang Le
(74) *Attorney, Agent, or Firm* — Buchanan Ingersoll & Rooney PC

(57) ABSTRACT

The invention relates to an electric motor/gear mechanism unit including a housing, an iron-free rotor winding rotatably arranged in the interior of the housing, a collector connected to the rotor winding, a rotor shaft extending through the collector, and a gear mechanism which is connected to the rotor shaft and which has an output shaft. The present invention is so conceived that the gear mechanism is produced from a non-magnetic material and arranged in the interior of the rotor winding.

12 Claims, 5 Drawing Sheets

(51) Int. Cl.
*H02K 23/58* (2006.01)
*H02K 1/22* (2006.01)
*H02K 1/27* (2006.01)
*H02K 9/00* (2006.01)

(56) References Cited

U.S. PATENT DOCUMENTS

| | | | |
|---|---|---|---|
| 5,621,260 | A | 4/1997 | Fukuoka et al. |
| 5,662,545 | A | 9/1997 | Zimmerman et al. |
| 5,952,751 | A | 9/1999 | Yamakoshi et al. |
| 6,100,615 | A | 8/2000 | Birkestrand |
| 6,500,087 | B2 | 12/2002 | Klinger et al. |
| 6,657,349 | B2 | 12/2003 | Fukushima |
| 7,211,016 | B2 | 5/2007 | Yan et al. |
| 7,420,303 | B2 | 9/2008 | Nishimura |
| 8,004,132 | B2 * | 8/2011 | Fukuoka ............ H02K 7/116 310/83 |
| 2004/0095037 | A1 | 5/2004 | Palmero |
| 2006/0039815 | A1 * | 2/2006 | Chertok ............ F02M 37/045 418/61.3 |

FOREIGN PATENT DOCUMENTS

| | | |
|---|---|---|
| JP | 50-103556 A | 8/1975 |
| JP | 54-67614 A | 5/1979 |
| JP | 09-047003 A | 2/1997 |
| JP | 09-158994 A | 6/1997 |
| JP | 10-174355 A | 6/1998 |
| JP | 2000-274495 A | 10/2000 |
| JP | 2001-275296 A | 10/2001 |
| JP | 2001-298901 A | 10/2001 |
| JP | 2003-88035 A | 3/2003 |
| JP | 2004-60713 A | 2/2004 |
| JP | 2009-284584 A | 12/2009 |

OTHER PUBLICATIONS

International Preliminary Report on Patentability (PCT/IPEA/409) mailed on Jun. 21, 2010, by the European Patent Office as the International Examining Authority for International Application No. PCT/EP2009/008518.

International Search Report (PCT/ISA/210) mailed on Oct. 1, 2009, by the European Patent Office as the International Searching Authority for International Application No. PCT/EP2009/004256.

Japanese Office Action (Notice of Reasons for Rejection) dated May 21, 2013, issued by the Japanese Patent Office in corresponding Japanese Patent Application No. P2011-535932. (English language translation of Office Action only, 4 pages).

* cited by examiner

ELECTRIC MOTOR/GEAR MECHANISM UNIT

This application is a continuation of prior application Ser. No. 13/120,859 filed Aug. 22, 2011, which is a National Stage of Application No. PCT/EP2009/008518 filed Nov. 30, 2009, which claims priority to Israel Application No. 195613 filed on Nov. 30, 2008, the entire contents of each of which are incorporated by reference herein.

The invention relates to an electric motor/gear mechanism unit according to the preamble of claim 1.

Electric motor/gear mechanism units according to the prior art are known e.g. from U.S. Pat. Nos. 4,918,344, 5,662,545, 6,500,087, 7,211,016, U.S. 2004/0095037 and GB 1007524A. The electric motor/gear mechanism units described there have a common housing for the electric motor and the gear mechanism. In many fields of use, there is an increasing demand for extremely compact electric motor/gear mechanism units, in particular for those having a high torque. There is an ever increasing demand for a compact structural design of the axial as well as of the radial dimensions of electric motor/gear mechanism units. The electric motor/gear mechanism units known from the prior art can no longer satisfy future demands and some of them require a high production outlay.

It is therefore the object of the present invention to provide an extremely compact electric motor/gear mechanism unit having a high torque. This object is achieved by the features of claim 1. The invention starts from an electric motor/gear mechanism unit comprising a housing, an iron-free rotor winding rotatably arranged in the interior of the housing, a collector connected to the rotor winding, a rotor shaft extending through the collector, and a gear mechanism which is connected to the rotor shaft and which has an output shaft. A solution according to the present invention is provided when the gear mechanism is arranged in the interior of the rotor winding, and when it consists externally of an annulus gear, which is preferably produced from a magnetic material, whereas the movable parts of the gear mechanism are produced from a non-magnetic material. Electric motors with an iron-free rotor winding normally have a very compact structural design in the radial direction. Making use of the solution according to the present invention a very compact structural design of the whole electric motor/gear mechanism unit is achieved also in the axial direction. Due to the fact that the annulus gear is produced from magnetic material, it also serves as a magnetic yoke for the magnetic circuit of the motor. The magnetic field of the permanent magnet will hardly enter the interior of the gear mechanism, when the gears meshing with the annulus gear are produced from a non-magnetic material. Losses caused by a reversal of magnetism, eddy currents and magnetic pressure forces are avoided in this way. In addition, the dual function of the gear mechanism housing can be used insofar as there will be more room for the gear mechanism, which means that the gear mechanism can be provided with a more stable structural design.

Advantageous further developments of the present invention are the subject matter of the subclaims.

According to a preferred embodiment of the present invention, a hollow permanent magnet is arranged in the interior of the rotor winding. This hollow permanent magnet is connected to the housing of the electric motor and defines thus the stator of the electric motor. The hollow permanent magnet encloses the gear mechanism of the electric motor/gear mechanism unit. On the basis of this structural design, very high degrees of efficiency of the electric motor and, consequently, of the entire electric motor/gear mechanism unit can be achieved.

Alternatively, the hollow permanent magnet may also be arranged outside of the rotor winding so that it encloses the rotor winding. In this case, the hollow permanent magnet can define the housing of the electric motor/gear mechanism unit. If an additional housing should be provided, it can be produced from a magnetic material and thus define a magnetic yoke.

According to another preferred embodiment of the present invention, the rotor shaft and the output shaft are in alignment with one another.

In accordance with another preferred embodiment, the gear mechanism is a planetary gear unit. Planetary gear units allow a realization of extremely high reduction ratios in combination with a compact structural design. Alternatively, spur gear units or bevel gear units may be used as well.

According to another preferred embodiment of the present invention, the planetary gear unit is configured such that it comprises at least one stage. The first gear stage of a planetary gear unit, which is connected to the rotor shaft, normally has applied thereto the highest loads. Each gear stage of planetary gear unit comprises a planetary carrier which is rotatable about an axis of rotation, a sun gear, an annulus gear and at least one planet gear. The end face of the planetary carrier is provided with a journal for each planet gear, said journal projecting from said end face and the planet gear being rotatably supported thereon by means of an axial bore. In view of manufacturing tolerances, high friction losses may occur between planet gears and the sun gear and annulus gear, respectively. This leads to a generation of a large amount of heat and to a short service life of the planetary gear unit. The friction losses can be reduced, when there is a certain amount of play between the planet gears and the sun gear and annulus gear, respectively. This is preferably achieved in that the planet gears are radially displaceable with respect to the axis of rotation of the planetary carrier. To this end, the journals of the planetary carrier are preferably implemented such that they have a substantially elliptical cross-section. The shorter one of the two principal axes of the ellipse extends in the radial direction of the planetary carrier. The measures for providing a certain amount of play between the planet gears and the sun gear and annulus gear, respectively, are preferably taken for the first stage of the planetary gear unit. They may, however, also be taken for the other stages of the planetary gear unit, if the planetary gear unit should comprise more than one gear stage. The play provided reduces the friction losses. This will also lead to a reduction of heat development and to a longer service life of the gear mechanism.

According to another preferred embodiment of the present invention, the rotor shaft has, on its end facing the gear mechanism, external teeth defining the sun gear of the first gear stage of a planetary gear unit. The outer diameter of said external teeth of the rotor shaft corresponds to the diameter of the rotor shaft itself. In the case of this embodiment, a pinion, which normally defines the sun gear of the first gear stage, need not be attached to the rotor shaft. The diameter of the sun gear is therefore smaller than in the case of an attached pinion. It is thus possible to accomplish a higher reduction ratio, whereby the torque of the electric motor/gear mechanism unit is increased.

According to a preferred embodiment, at least the teeth of the gears of the first gear stage are hardened or provided with a hard layer. In the case of non-magnetic metallic materials, said hardening can be carried out by means of a surface treatment, such as a chemical or a thermal treatment. This will increase the service life of the gear mechanism. In view of the high production costs for hardening or coating processes, the latter are only carried out in the first, highly loaded gear stage of the planetary gear unit. A suitable base material is e.g. non-magnetic steel. Alternative materials for the gears of the gear mechanism are particularly hard plastic materials, metallic glass or ceramic materials.

The service life of the electric motor/gear mechanism unit can be increased still further, when the housing is provided with cooling fins and/or with internal and/or external cooling channels for improved heat dissipation. The heat of the gear mechanism, the permanent magnet and the rotor winding is transferred to the housing via the air gap between the rotor and the stator. An improved dissipation of heat is accomplished, when the bearing seat of the rotor or of the rotor shaft has a large contact area.

In view of the fact that the service life of the electric motor exceeds that of the gear mechanism many times, even if more intensive measures are taken for increasing the service life of the gear mechanism, the gear mechanism is preferably adapted to be replaced and/or relubricated.

According to another preferred embodiment of the present invention, the gear mechanism is filled with oil so as to increase its service life.

Hollow-cylindrical permanent magnets are comparatively expensive to produce. According to another preferred embodiment of the present invention, the hollow stator permanent magnet is therefore composed of magnet segments. This allows production at a reasonable price.

In order to accomplish a better guidance of the rotor or the rotor winding and in order to avoid the rotor winding from rubbing against components of the stator, the rotor shaft is supported such that it is axially preloaded by means of a spring or a spring plate 35. To this end, a preloaded bearing seat is preferably provided in the brush cover.

In the case of the electric motor/gear mechanism unit according to the present invention, various electric motors can be used. It is imaginable to use e.g. alternating current as well as direct current motors, mechanically commutated or brushless motors and stepping motors.

In the following, a preferred embodiment of the present invention will be explained in more detail making reference to the drawings, in which.

Figure 1:
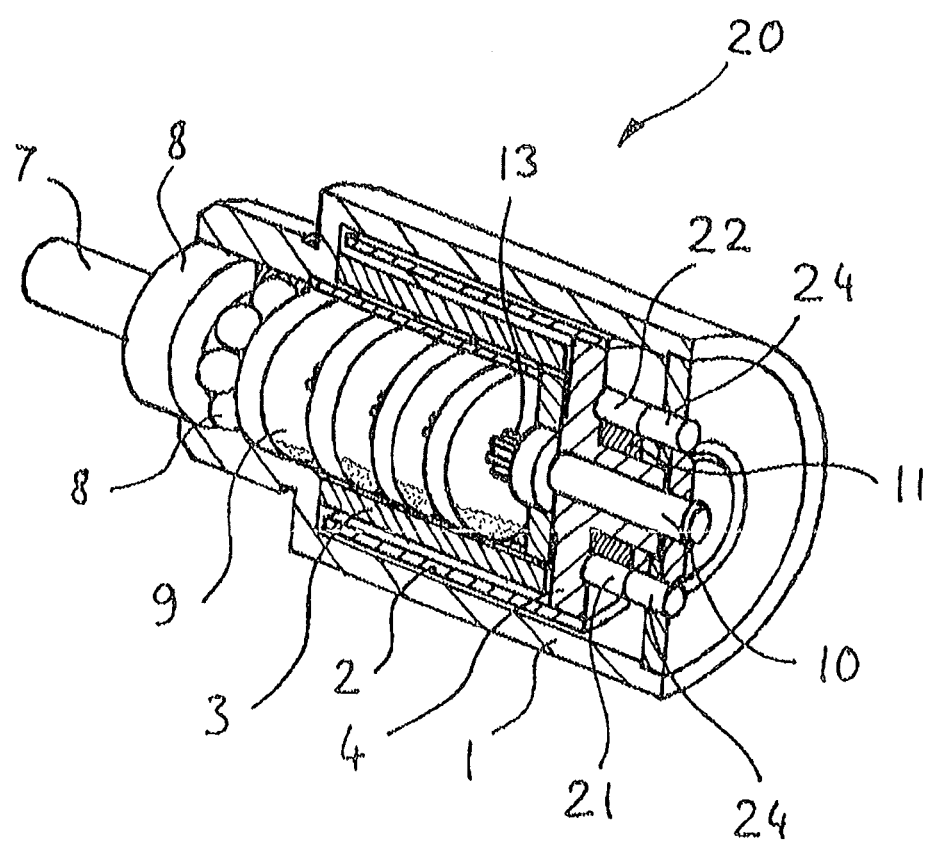
FIG. 1 shows an oblique view, part of which is a sectional view, of an electric motor/gear mechanism unit according to the present invention.
Figure 2:
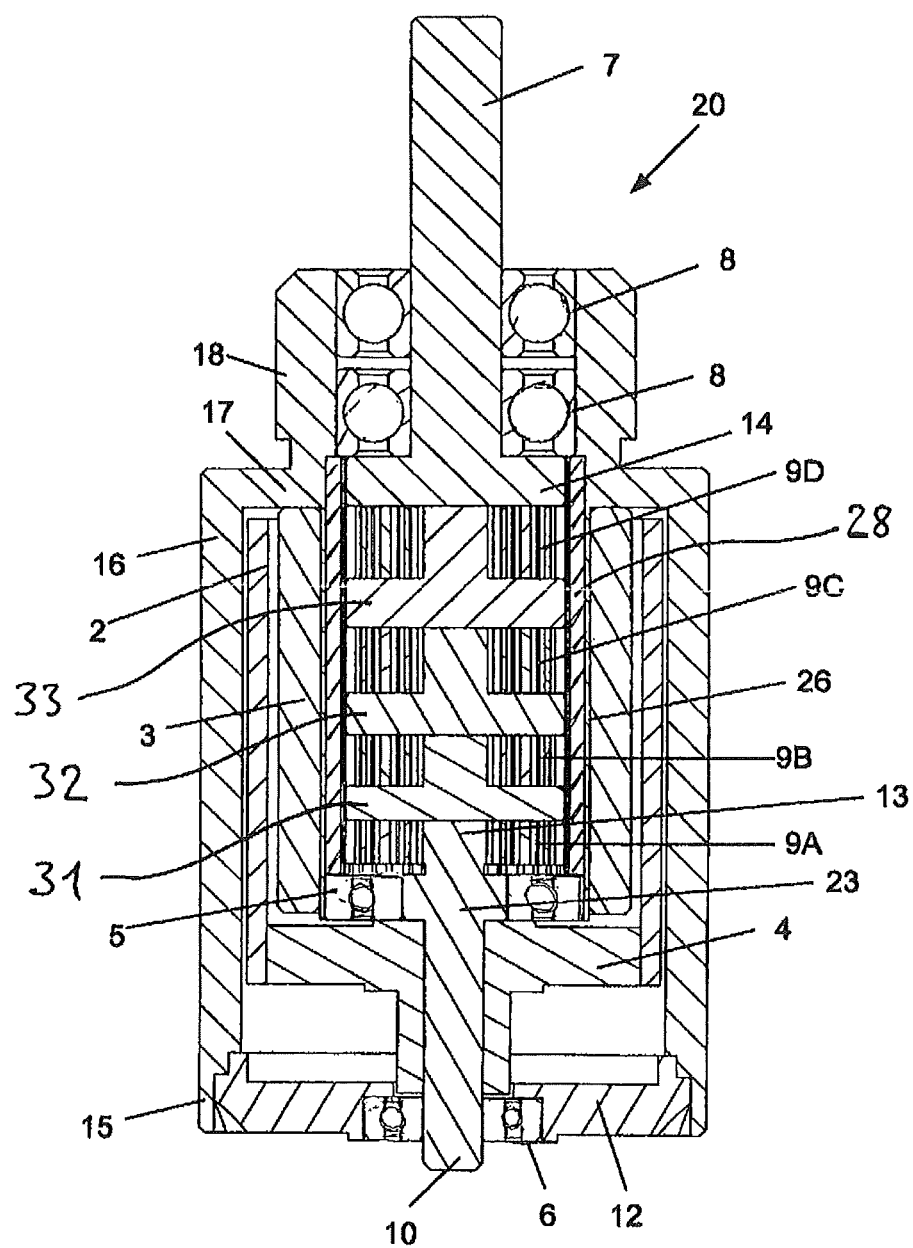
FIG. 2 shows a straight longitudinal sectional view of the electric motor/gear mechanism unit according to the present invention shown in FIG. 1.

FIGS. 1 and 2 show an electric motor/gear mechanism unit 20 according to a preferred embodiment of the present invention. The electric motor/gear mechanism unit 20 essentially comprises a bell-type armature motor with an iron-free rotor winding 2 of a known structural design, and a planetary gear unit 9 installed in the interior of the hollow cylindrical bell-type armature motor. The housing 1 of the electric motor/gear mechanism unit 20 according to the present invention has a brush cover-side end 15 and an output-side end 16. At the out-put-side end 16 the housing 1 merges with a neck portion 18 via an area of reduced width 17. In the interior of the housing 1 and concentrically therewith, an iron-free rotor winding 2 is arranged. This iron-free rotor winding 2 is connected via the collector 4 to the rotor shaft 10, coaxially with said rotor shaft and such that it is secured against rotation relative thereto. At the brush cover-side end 15 of the housing 1, the housing 1 is closed by a brush cover 12. The whole rotor including the iron-free rotor winding 2 is rotatably supported in the brush cover via the bearing 6 such that it is concentric with the housing 1. In the direction of the output-side end 16 of the housing, the rotor shaft 10 is, in addition, rotatably supported, via the bearing 5, on the hollow permanent magnet 3, which is connected to the housing 1 such that it is secured against rotation relative thereto. The rotor shaft 10 is supported in the bearing 5 via a small step-shaped flange 23 of the rotor shaft 10. The hollow cylindrical permanent magnet 3 extends around an annular support wall 26 after the fashion of a sleeve and is enclosed by an iron-free rotor winding 2. Between said iron-free rotor winding 2 and the hollow cylindrical permanent magnet 3 a small air gap is formed. In FIG. 1 it can be seen that the bell-type armature motor is configured as a brush-commutated motor. The commutation is effected via two carbon brushes 11 which slide over the collector 4 and which are held by the brush holders 21 and 22. The electric connection of the two carbon brushes 11 is established via the two connection cables 24.

On the rotor shaft end facing the interior of the electric motor/gear mechanism unit a pinion 13 defines the sun gear of the first gear stage of a four-stage planetary gear unit 9. The annulus gear 28 which the four gear stages have in common also defines the housing of the planetary gear unit 9. It follows that the planetary gear unit 9 defines an independent unit and can be installed in the interior of the bell-type armature motor in a fully mounted condition. The annulus gear 28 of the planetary gear unit 9 abuts on the annular support wall 26 of the housing 1 of the electric motor/gear mechanism unit 20 such that it is concentric and flush with said support wall 26. In FIG. 2, the planet gears of the gear stage are designated by reference numeral 9A, the planet gears of the second gear stage by reference numeral 9B, those of the third stage are, in a corresponding manner, designated by 9C, and those of the fourth stage by 9D. Furthermore, the planetary carriers of the first, second, third and fourth stages are sequentially designated by reference numerals 31, 32, 33 and 14. The planetary carriers of the first, second and third stages are connected to the sun gear of the respective subsequent stage. The planetary carrier 14 of the fourth stage simultaneously defines the flange for the output shaft 7 whose axis coincides with the axis of the rotor shaft 10. The output shaft 7 is rotatably supported via two bearings 8 in the neck portion 18 of the housing 1 of the electric motor/gear mechanism unit 20. All the sun gears, planet gears and planetary carriers of the planetary gear unit 9 are produced from non-magnetic materials so as to avoid interference and/or losses during operation of the electric motor/gear mechanism unit. In addition, the highly loaded first stage of the planetary gear unit 9 is provided with toothings hardened by surface finishing. Also the other components of the planetary gear unit 9, in particular the components of the other stages of the planetary gear unit, may at least be surface hardened or produced from particularly wear resistant non-magnetic materials. Reference should be made to the fact that, depending on the desired reduction ratio or depending on the desired torque of the output shaft 7, also planetary gear units comprising one to three stages may be used. Theoretically, it would also be possible to use a planetary gear unit comprising five or more stages, but the friction losses in the case of planetary gear units comprising five or more stages are so high that such planetary gear units are normally not used.

Figure 3:
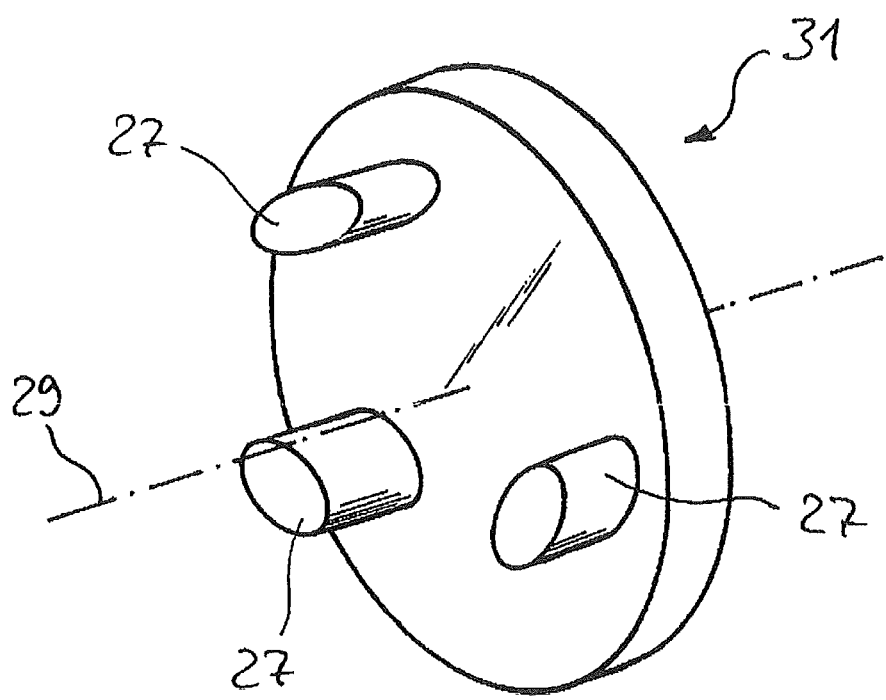
FIG. 3 shows the planetary carrier of the first stage of the planetary gear unit of the electric motor/gear mechanism unit according to the present invention as shown in FIGS. 1 and 2.

In FIG. 3 the planetary carrier 31 of the first gear stage of the planetary gear unit 9 is shown. In order to reduce the friction and the heat development in the first stage, the planet gears 9A of the first gear stage are intentionally supported with a certain amount of play. This intentional play is a play in the radial direction with respect to the axis of rotation 29 of the planetary carrier 31, which, due to the coaxial arrangement of the motor and the gear mechanism and due to the engagement of the pinion 13, coincides with the axis of rotation of the rotor shaft 10. Each of the planet gears 9A of the first gear stage is rotatably supported on a respective journal 27 of the planetary carrier 31 by means of a hollow cylindrical bore, said journals 27 being shown in FIG. 3. The journals 27 extend perpendicularly from the end face of the planetary carrier 31 parallel to the rotor shaft 10 and to the whole longitudinal axis of the electric motor/gear mechanism unit 20. The cross-section of the journals 27 is elliptical so that the shorter principal axis of the elliptical cross-section extends radially with respect to the axis of rotation 29 of the planetary carrier 31. The longer principal axis of the ellipse corresponds approximately to the diameter of the axial bore of the planet gears 9A. It follows that the planet gears 9A are supported with play in the radial direction with respect to the axis of rotation 29 of the planetary carrier 31. Due to the fact that they are supported with play, their optimum position with respect to the sun gear 13 of the first stage and the annulus gear 28 will be obtained automatically on the basis of the tolerances. Whereas in the case shown, three planet gears and three journals are provided, it is also possible to provide a different number of planet gears per stage. The embodiment that has been chosen in FIG. 3 for the planetary carrier 31 of the first gear stage of the planetary gear unit 9 can also be chosen for the other stages.

Figure 4:
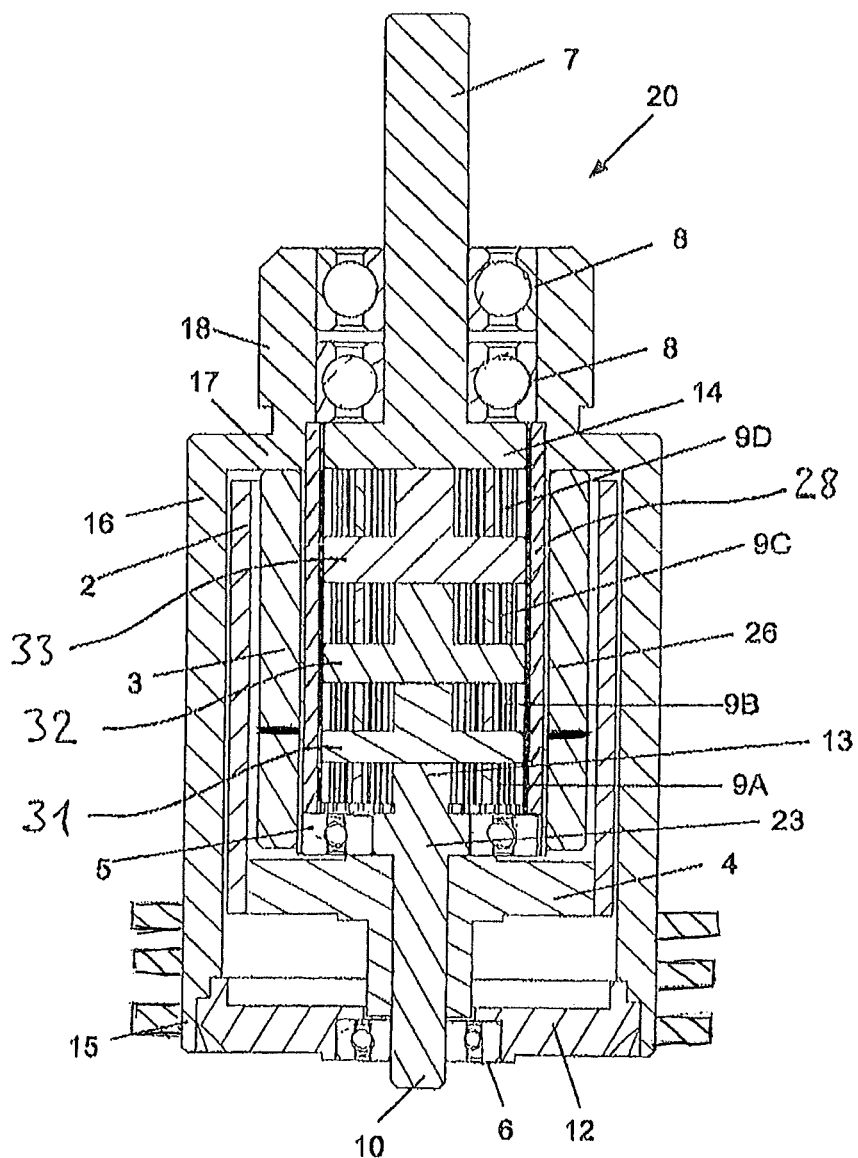
FIG. 4 shows a straight longitudinal sectional view of the electric motor/gear mechanism unit according to the present invention shown in FIG. 1.
Figure 5:
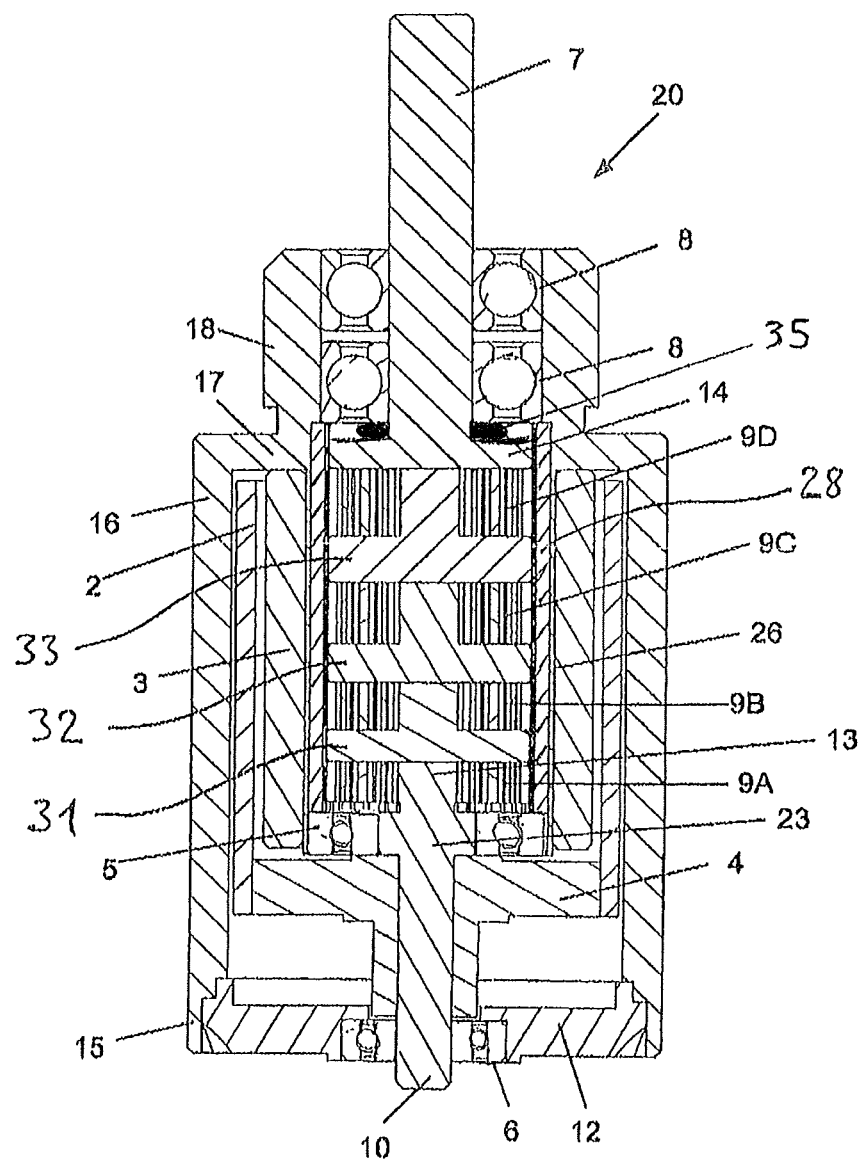
FIG. 5 shows a straight longitudinal sectional view of the electric motor/gear mechanism unit according to the present invention shown in FIG. 1.

When the service life of the old planetary gear unit 9 has come to an end, said old planetary gear unit 9 can be removed from the electric motor/gear mechanism unit as a separate subunit so that a new planetary gear unit 9 can be installed into the electric motor/gear mechanism unit 20. In addition to the already discussed measures taken for increasing the service life of the planetary gear unit 9, the planetary gear unit may also be completely filled with oil so as to accomplish an improved heat transfer. The oil also serves the purpose of lubrication. Cooling and heat dissipation of the electric motor/gear mechanism unit 20 is effected via cooling fins of the housing 1, which are shown in FIG. 4. Cooling can be improved still further through cooling channels in the housing 1.

The invention claimed is:

1. An electric motor/gear mechanism unit comprising:
a housing, an iron-free rotor winding rotatably arranged in an interior of the housing, a collector connected to the rotor winding, a rotor shaft extending through the collector, and a gear mechanism which is connected to the rotor shaft and which has an output shaft, wherein the gear mechanism is arranged in an interior of the rotor winding with an external, internally toothed annulus gear, wherein the internally toothed annulus gear is connected to the housing, wherein movable parts of the gear mechanism, including gears of the gear mechanism meshing with the internally toothed annulus gear, are produced from a non-magnetic material, and wherein a hollow permanent magnet enclosing the gear mechanism is arranged in the interior of the rotor winding and is connected to the housing, the housing and the annulus gear being formed of a magnetically soft material and forming magnetic yokes of the hollow permanent magnet.

2. An electric motor/gear mechanism unit according to claim 1, wherein the rotor shaft and the output shaft are in alignment with one another.

3. An electric motor/gear mechanism unit according to claim 1, wherein the gear mechanism is a planetary gear unit.

4. An electric motor/gear mechanism unit according to claim 3, wherein the planetary gear unit is configured such that it comprises at least one stage, each gear stage comprising a planetary carrier which is rotatable about an axis of rotation, a sun gear, an annulus gear and at least one planet gear, an end face of the planetary carrier further being provided with at least one journal which projects therefrom and on which the planet gear is rotatably supported, and at least said at least one planet gear of a first gear stage being implemented such that it is at least radially displaceable relative to an axis of rotation of the planetary carrier.

5. An electric motor/gear mechanism unit according to claim 4, wherein at least said at least one journal of the planetary carrier of the first gear stage has a substantially elliptical cross-section.

6. An electric motor/gear mechanism unit according to claim 4, wherein the rotor shaft has, on its end facing the gear mechanism, external teeth defining the sun gear of the first gear stage, an outer diameter of said external teeth of the rotor shaft corresponding to a diameter of the rotor shaft.

7. An electric motor/gear mechanism unit according to claim 4, wherein at least the teeth of the gears of the first gear stage are hardened or provided with a hard layer.

8. An electric motor/gear mechanism unit according to claim 1, wherein the housing is provided with cooling fins and/or with internal and/or external cooling channels.

9. An electric motor/gear mechanism unit according to claim 1, wherein the gear mechanism is configured to be replaced and/or relubricated.

10. An electric motor/gear mechanism unit according to claim 1, wherein the gear mechanism is filled with oil.

11. An electric motor/gear mechanism unit according to claim 1, wherein the hollow permanent magnet is composed of magnet segments.

12. An electric motor/gear mechanism unit according to claim 1, wherein the rotor shaft is supported such that it is axially preloaded by a spring or a spring plate.

* * * * *